United States Patent [19]

Abraham

[11] Patent Number: 5,492,073

[45] Date of Patent: Feb. 20, 1996

[54] INFLATABLE VEHICLE OCCUPANT RESTRAINT INCLUDING SEWN PANELS

[75] Inventor: Michelle M. Abraham, Macomb, Mich.

[73] Assignee: TRW Vehicle Safety Systems Inc., Lyndhurst, Ohio

[21] Appl. No.: 259,629

[22] Filed: Jun. 14, 1994

[51] Int. Cl.⁶ ............................ B60R 21/16; B65D 30/10
[52] U.S. Cl. ................................... 112/441; 280/743.1
[58] Field of Search ......................... 112/400, 441–426, 112/428; 280/728 R, 743 R, 741; 2/243.5

[56] References Cited

U.S. PATENT DOCUMENTS

| | | | |
|---|---|---|---|
| 1,764,848 | 6/1930 | Moffatt | 112/268.1 |
| 2,169,590 | 8/1939 | Myers | 112/425 |
| 2,215,834 | 9/1940 | Magliano | 2/248 |
| 3,514,125 | 5/1970 | Nemecek | 280/728 R |
| 3,879,056 | 4/1975 | Kawashima et al. | 280/743 R |
| 3,891,272 | 6/1975 | Takada | 280/743 R |
| 4,512,274 | 4/1985 | Campbell, Jr. et al. | 112/423 |
| 4,842,300 | 6/1989 | Ziomek et al. | 280/743 R |
| 5,071,161 | 12/1991 | Mahon et al. | 280/743 R |
| 5,087,071 | 2/1992 | Wallner et al. | 280/743 R |
| 5,114,180 | 5/1992 | Kami et al. | 280/743 R |
| 5,141,787 | 8/1992 | Yamamoto | 112/440 X |
| 5,290,059 | 3/1994 | Smith et al. | 280/741 X |

OTHER PUBLICATIONS

Federal Standard No. 751a, Stitches, Seams and Stitchings, Jan. 25, 1965, 262 pages.
Unpublished drawing entitled "FIG. 1: Prior Art Seams."

Primary Examiner—C. D. Crowder
Assistant Examiner—Ismael Izaguirre
Attorney, Agent, or Firm—Tarolli, Sundheim & Covell

[57] ABSTRACT

An inflatable vehicle occupant restraint (10) includes a first panel (44) of woven fabric, a second panel (40) of woven fabric, and a seam (52) at which the first and second panels (44, 40) are fastened to each other. The seam (52) includes a folded part (80) of the first panel (44) and a folded part (70) of the second panel (40). The folded part (80) of the first panel (44) includes two lapped plies (82, 84) of the first panel (44). The folded part (70) of the second panel (40) includes two lapped plies (72, 74) of the second panel (40). The folded parts (80, 70) of the first and second panels (44, 40) overlap each other so as to define a double-lapped part (89) of the seam (52) which includes four lapped plies (82, 84, 72, 74) of the first and second panels (44, 40). A first row (94) of stitches fastens the four lapped plies (82, 84, 72, 74) of the first and second panels (44, 40) to each other. A second row (90) of stitches is spaced from the double-lapped part (89) of the seam (52) and fastens the two lapped plies (82, 84) of the first panel (44) to each other.

16 Claims, 3 Drawing Sheets

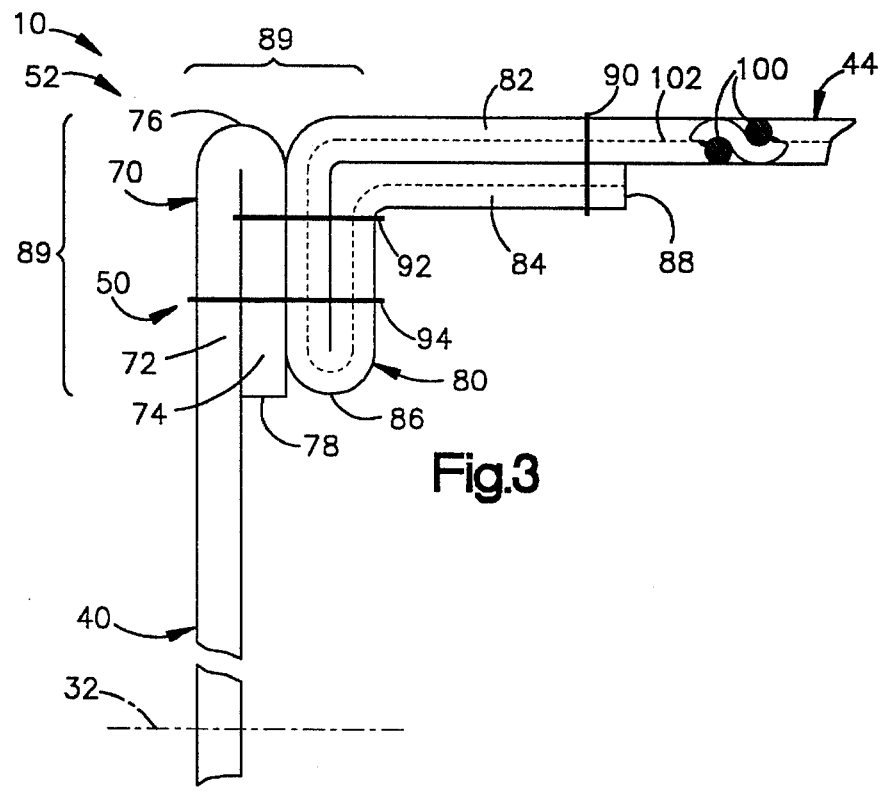
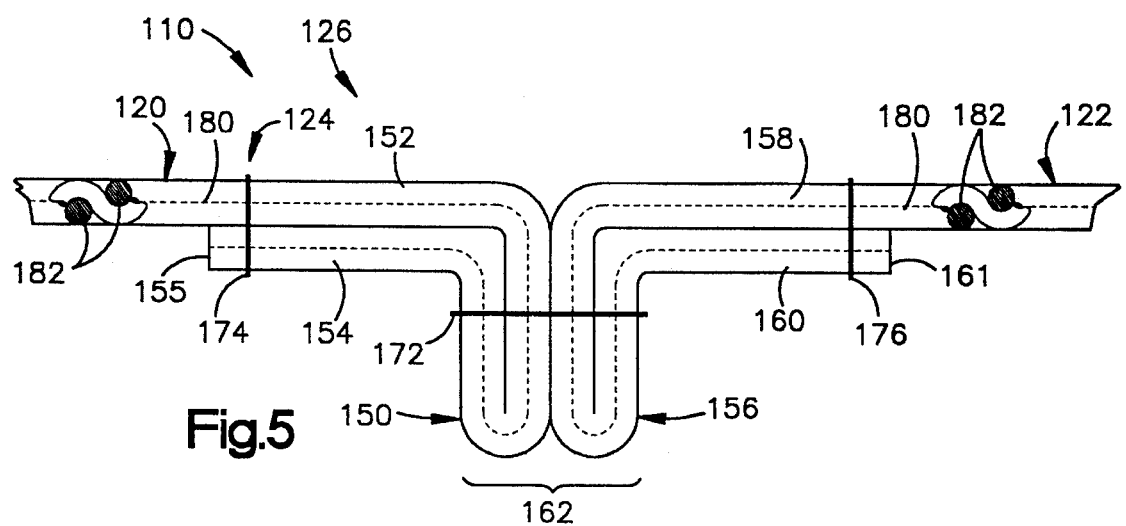
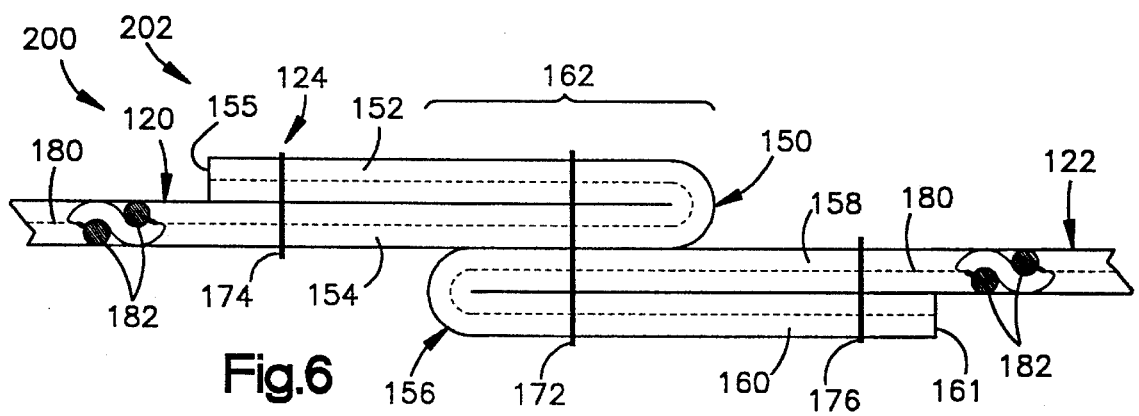

5,492,073

INFLATABLE VEHICLE OCCUPANT RESTRAINT INCLUDING SEWN PANELS

FIELD OF THE INVENTION

The present invention is directed to an inflatable vehicle occupant restraint such as an air bag.

BACKGROUND OF THE INVENTION

An inflatable vehicle occupant restraint, such as an air bag, is inflated upon the occurrence of a vehicle collision. Inflation fluid is directed to flow from a source of inflation fluid into the air bag to inflate the air bag. The inflation fluid inflates the air bag from a stored condition to an inflated condition in which the air bag extends into the vehicle occupant compartment. When the air bag is inflated into the vehicle occupant compartment, it restrains an occupant of a vehicle from forcefully striking parts of the vehicle.

An air bag typically comprises a plurality of panels of fabric that are sewn together. Specifically, the panels are fastened to each other by stitches at seams. When the air bag is inflated, the pressure of the inflation fluid acting outward against the panels from the inside of the air bag urges the panels to separate from each other at the seams.

SUMMARY OF THE INVENTION

In accordance with the present invention, an inflatable vehicle occupant restraint comprises a first fabric panel portion, a second fabric panel portion, and means for defining a seam at which the first and second panel portions are fastened to each other.

The means for defining a seam includes a folded part of the first panel portion and a folded part of the second panel portion. The folded part of the first panel portion comprises two lapped plies of the first panel portion. The folded part of the second panel portion comprises two lapped plies of the second panel portion. The folded parts of the first and second panel portions overlap each other so as to define a double-lapped part of the seam which comprises the four lapped plies of the first and second panel portions.

The means for defining a seam further includes first and second rows of stitches. The first row of stitches joins the four lapped plies of the first and second panel portions to each other at the double-lapped part of the seam. The second row of stitches is spaced from the double-lapped part of the seam, and fastens the two lapped plies of the first panel portion to each other.

An inflatable vehicle occupant restraint constructed in accordance with the present invention effectively resists combing and dropping off of the threads in the fabric panel portions. This feature of the present invention is a result of including the second row of stitches, which fastens the two lapped plies of the first panel portion to each other. The second row of stitches prevents the threads in the first panel portion from moving relative to each other under the influence of the fluid pressure forces directed against the seam by the inflation fluid in the restraint. The second row of stitches thus prevents combing and dropping off of the threads.

BRIEF DESCRIPTION OF THE DRAWINGS

Further features of the present invention will become apparent to those skilled in the art to which the present invention relates from reading the following description of the invention with reference to the accompanying drawings, in which:

FIG. 3 is a view taken on line 3—3 of FIG. 1;

FIG. 5 is a partial sectional view of an inflatable vehicle occupant restraint comprising a second preferred embodiment of the present invention; and FIG. 6 is a partial sectional view of an inflatable vehicle occupant restraint comprising a third preferred embodiment of the present invention.

DESCRIPTION OF PREFERRED EMBODIMENTS

Figure 1:
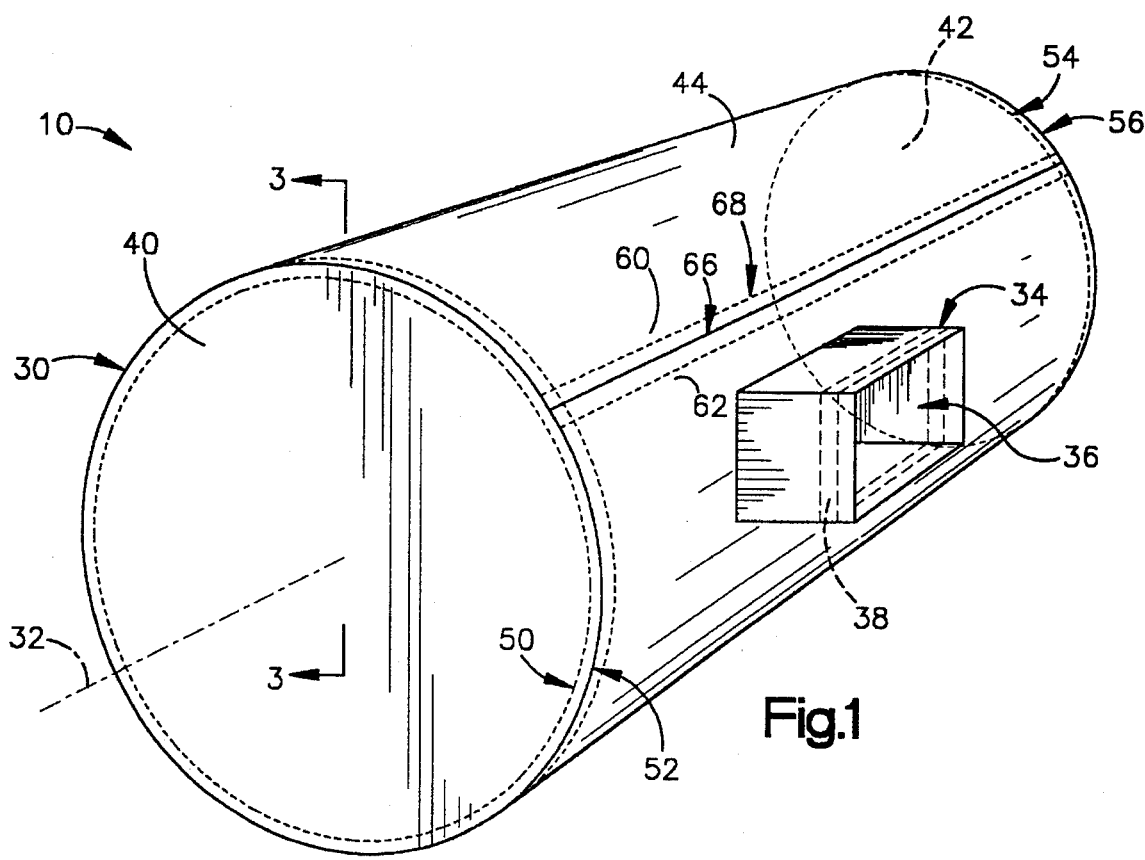
FIG. 1 is a schematic view of an inflatable vehicle occupant restraint comprising a first preferred embodiment of the present invention.
Figure 2:
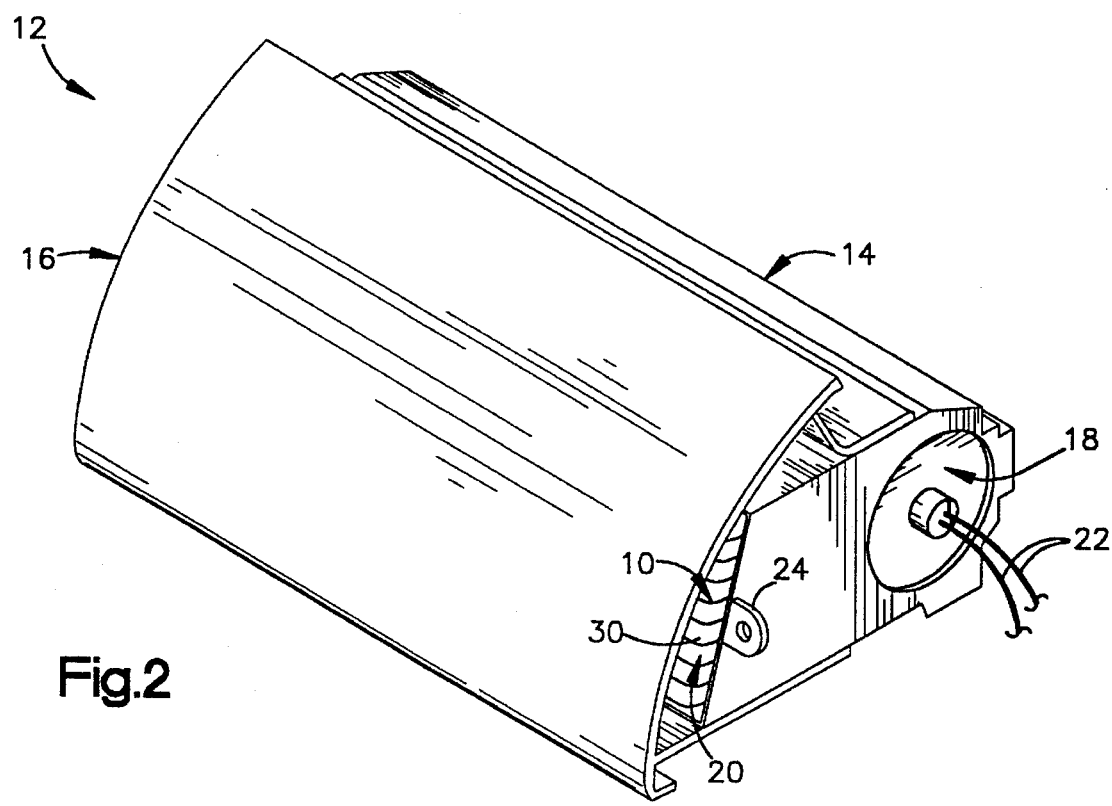
FIG. 2 is a view of a module including the vehicle occupant restraint of FIG. 1.

An inflatable vehicle occupant restraint 10 comprising a first preferred embodiment of the present invention is shown schematically in FIG. 1. The restraint 10, which is commonly referred to as an air bag, is a part of an air bag module 12 which is shown in FIG. 2. In addition to the air bag 10, the air bag module 12 includes a reaction canister 14, a deployment door 16, and an inflator 18.

The reaction canister 14 contains the air bag 10 in a stored, folded condition. The deployment door 16 extends over a deployment opening 20 at the front of the reaction canister 14. The inflator 18 is contained in the reaction canister 14 at the rear of the reaction canister 14. The inflator 18 comprises a source of inflation fluid for inflating the air bag 10 and may contain, for example, an ignitable gas generating material and/or a quantity of stored inflation fluid, as known in the art. The inflator 18 is actuated upon the passage of electric current between a pair of lead wires 22 extending into the inflator 18.

A pair of mounting tabs 24, one of which is shown in FIG. 2, project from the opposite sides of the reaction canister 14. The mounting tabs 24 are designed to receive fasteners for mounting the module 12 in the instrument panel at the passenger side of a vehicle. When the module 12 is mounted in the instrument panel, the deployment opening 20 faces toward the vehicle occupant compartment through an opening in the instrument panel. The deployment door 16 extends over the opening in the instrument panel to close the opening, and to conceal the air bag 10 and the reaction canister 14 from the vehicle occupant compartment.

When the vehicle experiences a collision, the inflator 18 is actuated and provides inflation fluid which is directed into the air bag 10. As the inflation fluid begins to inflate the air bag 10, it moves the air bag 10 outward through the deployment opening 20 in the reaction canister 14 and forcefully against the deployment door 16. The deployment door 16 ruptures under the stress induced by the pressure of the inflation fluid in the air bag 10, and thus releases the air bag 10 for movement outward from the deployment opening 20 and into the vehicle occupant compartment. A stress riser (not shown) of known construction, such as a thinned or notched section of material, is preferably included in the deployment door 16 so as to cause the deployment door 16 to rupture and move out of the path of the inflating air bag 10 as the inflating air bag 10 emerges from the reaction canister 16.

When the air bag 10 is inflated in the foregoing manner, it reaches an unfolded, inflated condition as shown schematically in FIG. 1. An outer portion 30 of the air bag 10 extends into the vehicle occupant compartment, and is inflated to a generally cylindrical configuration having a longitudinal central axis 32. An inner portion 34 of the air bag 10, which remains attached to the reaction canister 14, has a generally rectangular configuration. The inner portion 34 of the air bag 10 defines an inlet opening 36 for receiving the inflation fluid provided by the inflator 18 (FIG. 2), and contains a rigid retainer ring 38 for attaching the air bag 10 to the reaction canister 14. The inner portion 34 of the air bag 10 and the retainer ring 38 may have any suitable construction known in the art, and are attached to the reaction canister 14 by fasteners in a known manner.

The air bag 10 comprises a plurality of panels that comprise separate pieces of woven fabric. The pieces of woven fabric may be formed of any suitable material known in the art. The panels include a first end panel 40, a second end panel 42, and a main panel 44. The shapes of the panels 40, 42 and 44 may vary as desired. As illustrated in the drawings by way of example, the first end panel 40 comprises a circular piece of woven fabric, and defines a first end of the outer portion 30 of the air bag 10. The second end panel 42 also comprises a circular piece of woven fabric, and defines a second, opposite end of the outer portion 30 of the air bag 10. The main panel 44 comprises a rectangular piece of woven fabric, and defines the length of the outer portion 30 of the air bag 10 axially between the first and second end panels 40 and 42. When the air bag 10 is in the unfolded, inflated condition of FIG. 1, the first and second end panels 40 and 42 are centered on the axis 32, and the main panel 44 has a generally cylindrical tubular configuration extending longitudinally between the end panels 40 and 42.

The first end panel 40 is fastened to the main panel 44 by stitching 50 at a seam 52. The seam 52 extends circumferentially entirely around the periphery of the first end panel 40, and thus joins the first end panel 40 to the main panel 44 fully about the periphery of the outer portion 30 of the air bag 10 at the first end of the outer portion 30. The second end panel 42 is likewise fastened to the main panel 44 by stitching 54 at a seam 56. The seam 56 extends circumferentially entirely around the periphery of the second end panel 42, and thus joins the second end panel 42 to the main panel 44 fully about the periphery of the outer portion 30 of the air bag 10 at the second end of the outer portion 30.

As noted above, the main panel 44 is defined by a rectangular piece of woven fabric. The rectangular piece of woven fabric has opposite longitudinal edge portions 60 and 62. When the air bag 10 is assembled, the opposite longitudinal edge portions 60 and 62 of the rectangular piece are brought together at a longitudinally extending seam 66, and are fastened to each other entirely along their lengths by stitching 68 at the seam 66.

The seam 52 is shown in detail in FIG. 3. As shown in FIG. 3, the first end panel 40 has a folded part 70. The folded part 70 is defined by two lapped plies 72 and 74 of the first end panel 40, and defines a folded edge 76 of the first end panel 40. An end edge 78 of the first end panel 40 is defined by an end edge of the lapped ply 74 inside the air bag 10. The main panel 44 similarly has a folded part 80. The folded part 80 of the main panel 44 is defined by two lapped plies 78 and 80 of the main panel 44, and defines a folded edge 86 of the main panel 44. An end edge 88 of the main panel 44 is defined by an end edge of the lapped ply 84 inside the air bag 10. The folded part 70 of the first end panel 40 and the folded part 80 of the main panel 44 overlap each other so as to defined a double-lapped part 89 of the seam 52. The double-lapped part 89 of the seam 52 thus has a thickness which is defined by the four-lapped plies 72, 74, 82 and 84 of the two panels 40 and 44.

As shown schematically in FIG. 3, the stitching 50 at the seam 52 includes first, second and third rows 90, 92 and 94 of stitches. Each of the three rows 90–94 of stitches extends longitudinally along the entire length of the seam 52, and thus extends circumferentially entirely around the first end of the outer portion 30 of the air bag 10, as shown in FIG. 1. The stitches of which the rows 90–94 are formed may be of any suitable stitch type known in the art, such as a conventional lock stitch. Moreover, the stitching thread may be formed of any suitable material known in the art.

Figure 4A:
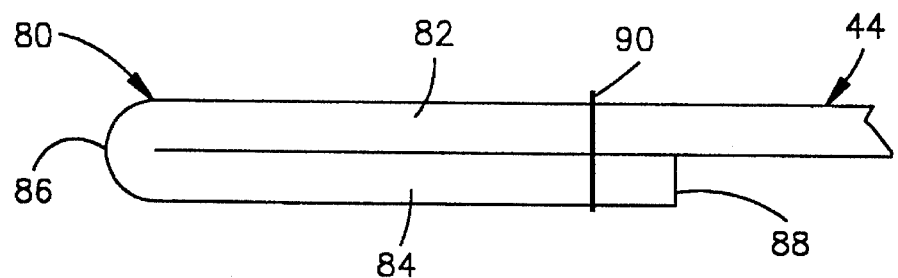
FIGS. 4A–4C are partial sectional views showing successive stages in the assembly of the vehicle occupant restraint of FIG. 1.

When the air bag 10 is being assembled, the seam 52 is formed by first folding the main panel 44 so as to define the folded part 80 of the main panel 44, as shown in FIG. 4A. The first row 90 of stitches is then formed in the folded part 80 at a location spaced slightly from the end edge 88. The first row 90 of stitches thus extends only through the two lapped plies 82 and 84 in the folded part 80 of the main panel 44, and thus fastens the two lapped plies 82 and 84 of the main panel 44 only to each other.

Figure 4B:
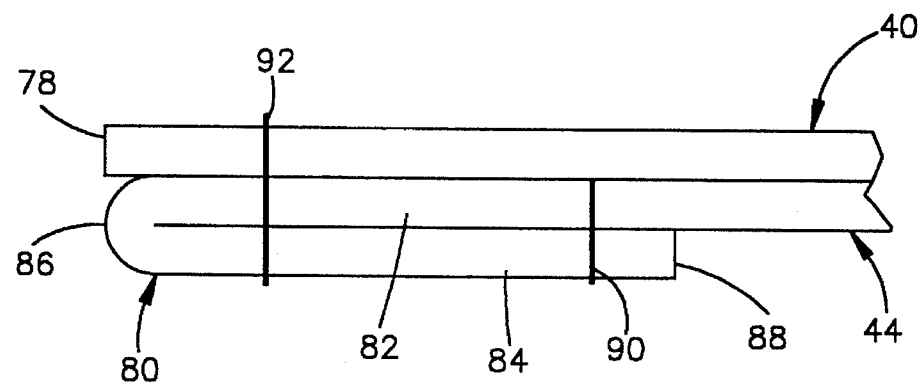

When the folded part 80 of the main panel 44 and the first row 90 of stitches have been formed as shown in FIG. 4A, the first end panel 40 is placed over the main panel 44 as shown in FIG. 4B. The end edge 78 of the first end panel 40 is aligned with the folded edge 86 of the main panel 44, and the second row 92 of stitches is formed at a location between the first row 90 of stitches and the aligned edges 78 and 86. The second row 92 of stitches extends through the first end panel 40 and through the two lapped plies 82 and 84 in the folded part 80 of the main panel 44. The second row 92 of stitches thus fastens the first end panel 40 to the main panel 44 at the folded part 80 of the main panel 44. The first end panel 40 is then folded from the configuration of FIG. 4B to the configuration of FIG. 4C so as to define the folded part 70 of the first end panel 40.

Figure 4C:
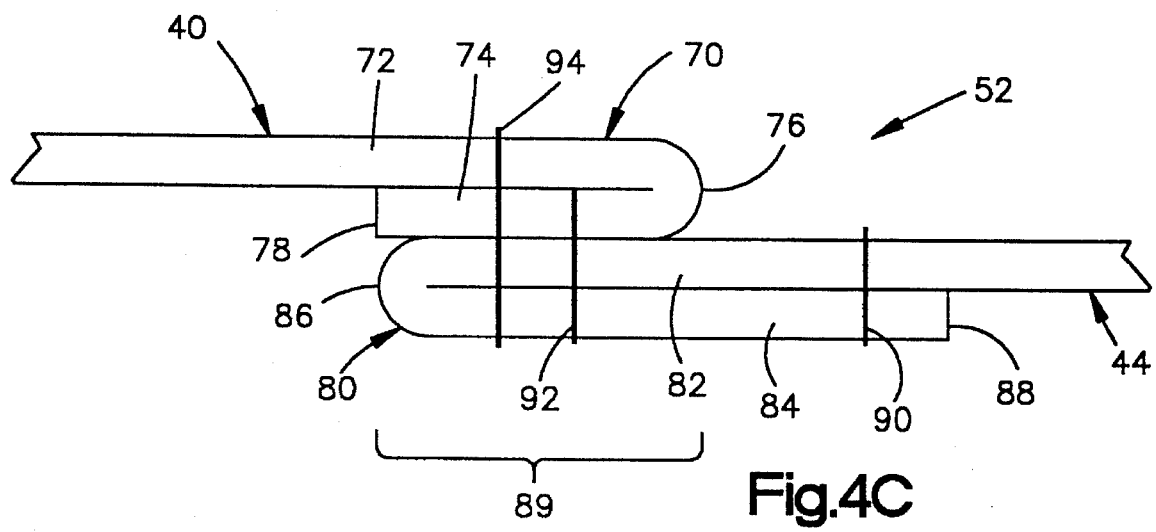

The third row 94 of stitches is formed at a location between the second row 92 of stitches and the aligned edges 78 and 86 of the two panels 40 and 44, as shown in FIG. 4C. The third row 94 of stitches thus extends through all of the four lapped plies 72, 74, 82 and 84 at the double-lapped part 89 of the seam 52, and fastens the four lapped plies 72, 74, 82 and 84 to each other at the double-lapped part 89 of the seam 52. The panels 40 and 44 are thus fastened to each other at the seam 52 so as to take the configuration shown in FIG. 3 when the air bag 10 is inflated.

As further shown schematically in FIG. 3, the main panel 44 has warp threads 100, two of which are shown in cross-section. The main panel 44 further has weft threads 102, one of which is shown partially in a side view. Alternatively, the main panel could have an orientation in which the warp threads 100 would be shown in a side view in FIG. 3, with the weft threads 102 being shown in cross-section. In any case, the main panel 44 has a plurality of threads that extend longitudinally in the directions in which the weft threads 102 are shown to extend in FIG. 3. Such threads in the main panel 44 thus extend axially through the lapped ply 84 from the end edge 88 to the double-lapped part 89 of the seam 52, radially inward, and then radially outward, through the portion of the folded part 80 that is included in the double-lapped part 89 of the seam 52, and axially away from the double-lapped part 89 of the seam 52 through the other lapped ply 82.

When the air bag 10 is in the unfolded, inflated condition of FIG. 1, the pressure of the inflation fluid inside the air bag 10 acts outward against the panels 40, 42 and 44. The first end panel 40 and the main panel 44 are then subjected to fluid pressure forces that urge them to separate from each other at the seam 52. The weft threads 102 in the main panel 44 are thus subjected to fluid pressure forces that urge them to move longitudinally away from the seam 52. As viewed in FIG. 3, the weft threads 102 in the main panel 44 are urged to move axially through the lapped ply 84 from the end edge 88 toward the double-lapped portion 89 of the seam 52, radially inward, and radially outward, through the portion of the folded part 80 that is included in the double-lapped part 89 of the seam 52, and axially away from the double-lapped part 89 of the seam 52 through the other lapped ply 82. Such movement of the weft threads 102 could result in "combing" of the threads in the main panel 44, and could further result in dropping off of the warp threads 100 from the weft threads 102 adjacent to the end edge 88 of the main panel 44. However, the first row 90 of stitches fastens the two lapped plies 82 and 84 to each other. Therefore, the forces that act axially from left to right, as viewed in FIG. 3, against the lapped ply 82 are imparted to the lapped ply 84 by the first row 90 of stitches. The forces that act axially to the right against the lapped ply 84 counteract the forces that act axially to the left against the lapped ply 84. As a result, the portions of the weft threads 102 that are located in the lapped ply 84 are not moved by the fluid pressure forces in the foregoing manner, but instead remain in place relative to the warp threads 100. The first row 90 of stitches thus prevent combing and dropping off of the threads in the main panel 44.

The seam 56, at which the second end panel 42 is fastened to the main panel 44, has the same structure as described above with reference to the seam 52 at which the first end panel 40 is fastened to the main panel 44. Combing and dropping off of the threads in the main panel 44 is thus prevented at the seam 56 in the same manner as described above with reference to the seam 52.

An inflatable vehicle occupant restraint 110 comprising a second preferred embodiment of the present invention is shown partially in FIG. 5. The restraint 110, which also is an air bag, has a first panel portion 120 and a second panel portion 122. The first and second panel portions 120 and 122 of the air bag 110 may be defined by respective separate pieces of fabric, or by respective edge portions of a single piece of fabric, and are fastened to each other by stitching 124 at a seam 126.

As shown in FIG. 5, the first panel portion 120 of the air bag 110 has a folded part 150 which is defined by two lapped plies 152 and 154 of the first panel portion 120. The lapped ply 154 has an end edge 155 inside the air bag 110. The second panel portion 122 of the air bag 110 has a folded part 156 which is defined by two lapped plies 158 and 160 of the second panel portion 122. The lapped ply 160 also has an end edge 161 inside the air bag 110. The folded parts 150 and 156 of the first and second panel portions 120 and 122 of the air bag 110 overlap each other so as to define a double-lapped part 162 of the seam 126. The double-lapped part 162 of the seam 126 thus has a thickness which is defined by the four lapped plies 152, 154, 158 and 160 of the two panel portions 120 and 122.

The stitching 124 at the seam 126 includes first, second, and third rows 172, 174 and 176 of stitches. Like the stitches described above with reference to the seam 52, the stitches of which the rows 172–176 are formed may be of any suitable stitch-type known in the art, such as a conventional lock stitch, and the stitching thread may be formed of any suitable material known in the art.

The first row of stitches 172 extends through all of the four lapped plies 152, 154, 158 and 160 at the double-lapped part 162 of the seam 126. The first row 172 of stitches thus fastens the four lapped plies 152, 154, 158 and 160 to each other at the double-lapped part 162 of the seam 126.

The second row 174 of stitches extends through the folded part 150 of the first panel portion 120 at a location spaced from the double-lapped part 162 of the seam 126. The second row 174 of stitches extends through only the two lapped plies 152 and 154 of the first panel portion 120 of the air bag 110, and thus fastens the two lapped plies 152 and 154 only to each other. In a similar manner, the third row 176 of stitches is spaced from the double-lapped part 162 of the seam 126, and extends through only the two lapped plies 158 and 160 of the second panel portion 122 of the air bag 110. The third row 176 of stitches thus fastens the two lapped plies 158 and 160 of the second panel portion 122 only to each other.

When the air bag 110 is inflated, the pressure of the inflation fluid inside the air bag 110 urges the panel portions 120 and 122 to separate from each other at the seam 126. The warp (or weft) threads 180 in the panel portions 120 and 122, which are shown in side views in FIG. 5, are thus subjected to fluid pressure forces that urge them to move longitudinally away from the seam 126 in opposite directions. Such movement of the threads 180 could result in combing of the threads at the panel portions 120 and 122, and could further result in dropping off of the weft (or warp) threads 182 adjacent to the end edges 155 and 161 of the lapped plies 154 and 160. However, the second row 174 of stitches fastens the two lapped plies 152 and 154 to each other, and the third row 176 of stitches fastens the two lapped plies 158 and 160 to each other, in the same manner as described above with reference to the first row 90 of stitches in the seam 52. The rows 174 and 176 of stitches thus prevent combing and dropping off of the threads in the panel portions 120 and 122 of the air bag 110 the same manner as described above with reference to the row 90 of stitches and the threads in the panels 40 and 44 in the air bag 10.

An inflatable vehicle occupant restraint 200 comprising a third preferred embodiment of the present invention is shown partially in FIG. 6. The restraint 200 also is an air bag and, as indicated by the use of the same reference numbers in FIGS. 5 and 6, the has several parts that are the same as corresponding parts of the air bag 110. Such parts of the air bag 200 include panel portions 120 and 122 having woven threads 180 and 182. The panel portions 120 and 122 of the air bag 200 are fastened to each other at a seam 202. A folded part 150 of the first panel portion 120 overlaps a folded part 156 of the second panel portion 122 in the manner shown in FIG. 6. The seam 202 shown in FIG. 6 thus differs somewhat from the seam 126 shown in FIG. 5. However, the seam 202 includes stitching 124 which is substantially the same as the stitching 124 in the seam 126. The second and third rows 174 and 176 of stitches in the seam 202 thus prevent combing and dropping off of the threads in the panel portions 120 and 122 of the air bag 200 in the same manner as described above with reference to the corresponding rows 174 and 176 of stitches in the seam 126 in the air bag 110.

From the above description of the invention, those skilled in the art will perceive improvements, changes and modifications. For example, the invention has been described with reference to a passenger side air bag having a generally cylindrical shape, but is equally applicable to air bags or other inflatable vehicle occupant restraints that are used at different locations in a vehicle and that have different shapes. For clarity of illustration, each of the fabric panels in the preferred embodiments of the present invention is shown in the drawings to be defined by a single ply of woven fabric. However, an inflatable vehicle occupant restraint constructed in accordance with the present invention can include one or more panels comprising multiple plies of woven fabric. Additionally, the particular locations at which panel portions of an inflatable vehicle occupant restraint are fastened to each other in accordance with the present invention may differ from those described above. Such improvements, changes and modifications within the skill of the art are intended to be covered by the appended claims.

Having described the invention, the following is claimed:

1. Apparatus comprising:

an inflatable vehicle occupant restraint comprising a first fabric panel portion, a second fabric panel portion, and means for defining a seam at which said first and second panel portions are fastened to each other;

said means for defining a seam including a folded part of said first panel portion which comprises two lapped plies of said first panel portion, and a folded part of said second panel portion which comprises two lapped plies of said second panel portion, said folded parts of said first and second panel portions overlapping each other so as to define a double-lapped part of said seam which comprises said lapped plies of said first and second panel portions;

said means for defining a seam further including first and second rows of stitches, said first row of stitches fastening said lapped plies of said first and second panel portions to each other at said double-lapped part of said seam, said second row of stitches being spaced from said double lapped part of said seam and fastening said two lapped plies of said first panel portion to each other.

2. Apparatus as defined in claim 1 wherein said second row of stitches fastens said two lapped plies of said first panel portion only to each other.

3. Apparatus as defined in claim 1 wherein said means for defining a seam further includes a third row of stitches spaced from said double-lapped part of said seam, said third row of stitches fastening said two lapped plies of said second panel portion to each other.

4. Apparatus as defined in claim 3 wherein said third row of stitches fastens said two lapped plies of said second panel portion only to each other.

5. Apparatus as defined in claim 1 wherein said first and second panel portions are defined by separate pieces of fabric.

6. Apparatus as defined in claim 1 wherein said first and second panel portions are defined by a single piece of fabric.

7. Apparatus as defined in claim 1 wherein said folded part of said first panel portion defines a first folded edge at a juncture of said two plies of said first panel portion, said folded part of said second panel portion defining a second folded edge at a juncture of said two plies of said second panel portion, said first and second folded edges facing oppositely away from each other.

8. Apparatus as defined in claim 1 wherein said folded part of said first panel portion includes an end edge of said first panel portion, said folded part of said second panel portion including an end edge of said second panel portion, said end edges being located inside said restraint.

9. Apparatus comprising:

an inflatable vehicle occupant restraint comprising a first fabric panel portion, a second fabric panel portion, and means for defining a seam at which said first and second panel portions are fastened to each other;

said first panel portion comprising a plurality of woven threads that extend longitudinally from said seam in a first direction when said restraint is inflated, said second panel portion comprising a plurality of woven threads that extend longitudinally from said seam in a second direction when said restraint is inflated;

said means for defining a seam including a folded part of said first panel portion which comprises two lapped plies of said first panel portion, and a folded part of said second panel portion which comprises two lapped plies of said second panel portion, said folded parts of said first and second panel portions overlapping each other so as to define a double-lapped part of said seam which comprises said lapped plies of said first and second panel portions;

said means for defining a seam further including first and second rows of stitches, said first row of stitches fastening said lapped plies of said first and second panel portions to each other at said double-lapped part of said seam, said second row of stitches being spaced from said first row of stitches in said first direction and fastening said two lapped plies of said first panel portion only to each other.

10. Apparatus as defined in claim 9 wherein said second row of stitches is spaced from said double-lapped part of said seam in said first direction.

11. Apparatus as defined in claim 9 wherein said means for defining a seam further includes a third row of stitches spaced from said first row of stitches in said second direction, said third row of stitches fastening said two lapped plies of said second panel portion only to each other.

12. Apparatus as defined in claim 11 wherein said third row of stitches is spaced from said double-lapped part of said seam in said second direction.

13. Apparatus as defined in claim 9 wherein said first and second panel portions are defined by separate pieces of woven fabric.

14. Apparatus as defined in claim 9 wherein said first and second panel portions are defined by a single piece of woven fabric.

15. Apparatus as defined in claim 9 wherein said folded part of said first panel portion defines a first folded edge at a juncture of said two plies of said first panel portion, said folded part of said second panel portion defining a second folded edge at a juncture of said two plies of said second panel portion, said first and second folded edges facing oppositely away from each other.

16. Apparatus as defined in claim 9 wherein said folded part of said first panel portion includes an end edge of said first panel portion, said folded part of said second panel portion including an end edge of said second panel portion, said end edges being located inside said restraint.

* * * * *